United States Patent Office 3,371,768
Patented Mar. 5, 1968

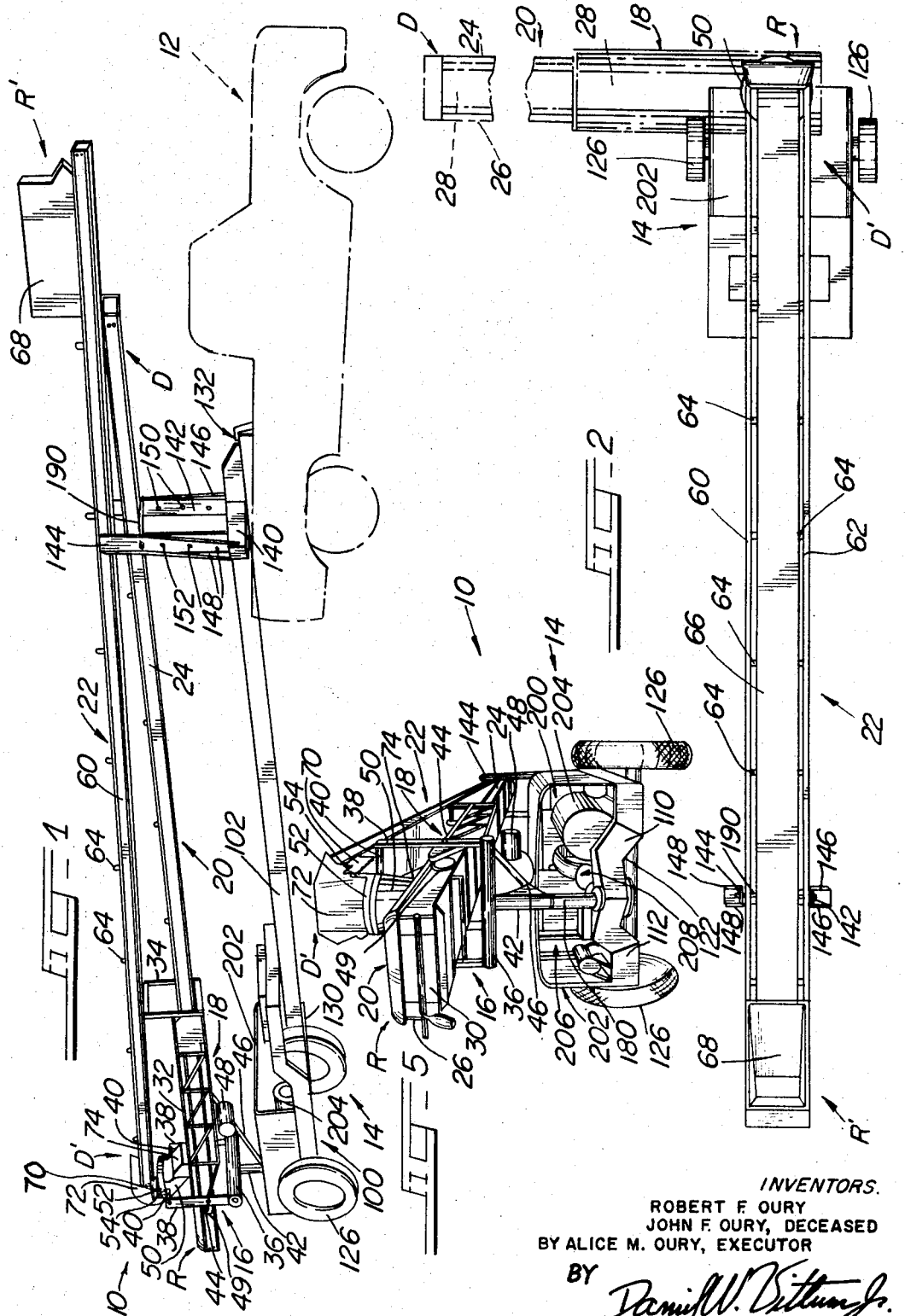

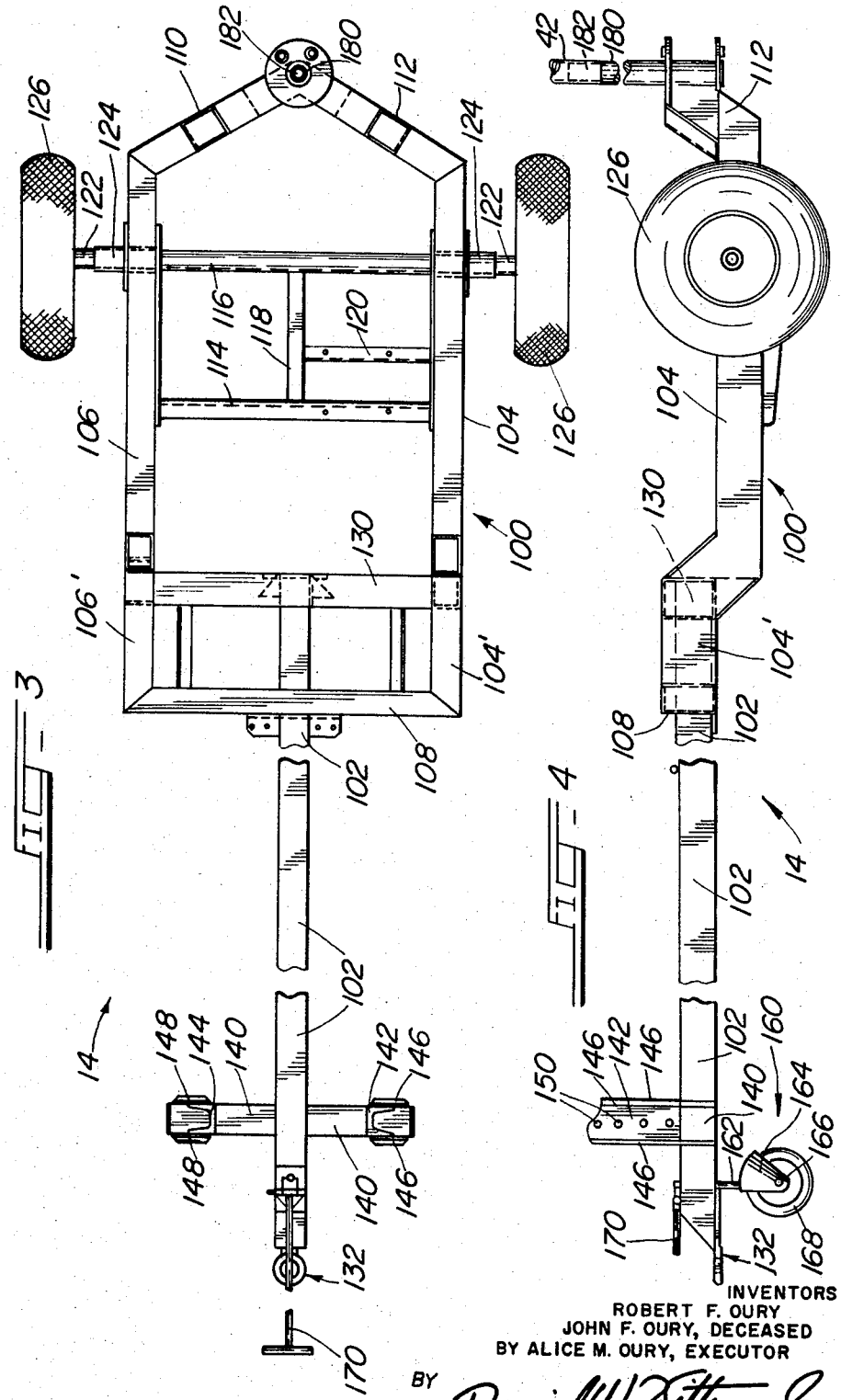

3,371,768
CONVEYOR CONSTRUCTION
Robert F. Oury, Wayne, and John F. Oury, deceased, late of Wheaton, Ill., by Alice M. Oury, executor, Wheaton, Ill., assignors to Oury Engineering Company, Elmhurst, Ill., a corporation of Delaware
Continuation-in-part of application Ser. No. 575,503 Aug. 25, 1966. This application Oct. 17, 1966, Ser. No. 587,344
12 Claims. (Cl. 198—92)

ABSTRACT OF THE DISCLOSURE

A mobile trailer assembly adapted to support a feeding conveyor and distributing conveyor features a frame mounting yoke mounted at one end of the trailer assembly and adapted for rotational movement about a vertical axis. A support frame assembly is mounted in cantilever fashion adjacent one of its ends on the frame mounting yoke and is adapted for movement about a horizontal axis. The distributing conveyor is mounted on rollers carried by the frame mounting means for controlled longitudinal movement such that concrete mix and the like may be discharged from the distributing conveyor without supporting the discharge end thereof. During the distributing mode of operation, one end of the feeding conveyor is pivotally mounted above the distributing conveyor, and the opposite end is supported by upstanding brackets located on the trailer assembly. During the transport mode of operation, both the feeding and distributing conveyors are supported by the upstanding brackets.

---

This application is a continuation-in-part of co-pending Oury et al. United States patent application Ser. No. 575,503, filed Aug. 25, 1966, now Patent No. 3,343,651.

The present invention relates to conveyor systems and more specifically to conveyor constructions for distributing material at the terminal end of a mobile conveying system.

The construction industry has long felt the need to devise improved techniques for placing concrete mix and in recent times has placed increasing reliance on conveyors for economically distributing concrete mix in all types of locations, especially where the work area is not easily accessible to laborers. As illustrated in Oury et al. United States Patent No. 3,151,732, granted Oct. 6, 1964, a number of conveyors may be employed in substantially end-to-end relationship to move concrete mix to the location at which it is to be poured, and in such a system, the terminal conveyor is mounted for pivotal and longitudinal movements so that the concrete can be distributed over a wide area.

A more advanced conveyor system for distributing concrete mix is illustrated in the aforesaid co-pending application Ser. No. 575,503. In that system the conveyor apparatus is movably mounted on a rail system which is set up along a path leading up to the discharge point. The terminal or distributing conveyor in the system is mounted in cantilever fashion from a support frame which is pivoted to allow the distributing conveyor to swing through 360° and to project outwardly from the frame to any desired length without the need for support at the terminal end thereof. Moreover, a brace provided under the conveyor frame is adjustable to raise the distributing conveyor to any desired degree of elevation during operation. Since the distributing conveyor can be extended a great distance beyond the supporting frame and can be elevated to any desired degree, the terminal end of the conveyor can easily be employed to discharge concrete mix over a large area that may include positions that are not normally accessible to workmen.

In certain circumstances it would be advantageous to provide such a distributing conveyor structure on a structure means that may be quickly and easily moved from place to place in order to avoid the necessity for positioning a series of rail sections and supporting stands as shown in the aforesaid co-pending application. While such a rail system provides a stable platform for distributing the conveyor, in certain cases difficulties may be encountered in positioning the assembly. Moreover, for relatively small pouring jobs, the labor involved in assembling the monorail track renders such a system uneconomical.

Accordingly, a primary object of the present invention is to provide a new and unique mounting arrangement for a distributing conveyor of the character described in the aforesaid co-pending applications.

A related object of the present invention is to provide a conveyor distribution system of the character described which can be moved into close proximity to the location at which material is to be discharged with a minimum of equipment and effort.

Another object of the present invention is to provide a convenient means for distributing concrete mix over a wide area.

It is a further object of the invention to provide a conveyor device of the character described that is adaptable to operate in a variety of locations encountered in construction work.

It is still a further object of the invention to provide a conveyor system that can be advantageously employed in restricted locations.

Yet another object is to provide a means of mounting a distributing conveyor system which is mobile and easily transported to a location proximate to the work area.

A further object is to provide an arrangement for supporting a conveyor system and including self-contained power source means for moving and controlling the conveyors.

Another object is to provide a distributing conveyor system that requires a minimum amount of labor to set up and operate.

These and other objects, advantages, and features of the present invention will hereinafter appear, and, for purposes of illustration, but not of limitation, exemplary embodiments of the present invention are shown in the accompanying drawings, in which:

FIGURE 1 is a perspective view of one embodiment of the present invention in an arrangement suitable for pulling by a pick-up truck;

FIGURE 2 is a top plan view of the embodiment shown in FIGURE 1 including a broken line top view of the supporting frame and distributing conveyor as it appears when pivoted 90° in relation to the trailer;

FIGURE 3 is a fragmentary plan view of the trailer portion of the invention shown in FIGURES 1 and 2.

FIGURE 4 is a fragmentary side elevational view of the trailer portion; and

FIGURE 5 is a rear perspective view of the embodiment of the invention shown in FIGURE 1.

Briefly described, the present invention in its preferred embodiment comprises a transport and support trailer assembly adapted to support a feeding conveyor and a distributing conveyor. More particularly, the device of the invention comprises: a transport and support trailer assembly adapted for normal vehicular travel and further adapted for positioning near the location at which concrete mix is to be deposited; frame mounting means mounted on the trailer assembly adjacent one end thereof for rotational movement about a vertical axis; a support frame assembly mounted adjacent one of its ends on the frame mounting means in a cantilever fashion for pivotal movement about a horizontal axis; distributing conveyor means mounted for longitudinal telescoping movement upon the cantilevered support frame assembly; conveyor support means on the trailer assembly adjacent the other end thereof; feeding conveyor means pivotally mounted at one end on the frame mounting means and adapted to be supported at its other end by the conveyor support means; and means for directing concrete mix from the said one end of the feeding conveyor means to an adjacent point on the distributing conveyor means, whereby the trailer assembly and feeding conveyor means stabilize the said device when the distributing conveyor means is longitudinally moved to an extended position on the support frame assembly.

With reference to the drawings, FIGURE 1 illustrates the preferred embodiment of the present invention in the form of a conveyor construction 10 arranged to be drawn by a vehicle, such as a truck 12, shown in broken lines in the drawings. Portions of the apparatus illustrated in the drawings are shown and described in greater detail in the aforesaid Ser. No. 575,503 application, the disclosure of which is hereby incorporated by reference herein.

Conveyor construction 10 comprises a mobile transport and support trailer assembly 14; a yoke 16 pivotally mounted on trailer assembly 14; a support frame assembly 18 mounted in cantilever fashion on yoke 16; a distributing conveyor 20 supported on assembly 18 in a cantilever fashion for longitudinal movements; and a feeding conveyor 22 supported by the trailer assembly 14 and by the yoke 16.

More specifically, a distributing conveyor 20 has a discharge end D and a receiving end R and comprises a pair of side channel members 24, 26. An endless V-shaped belt 28 is mounted on idler rollers (not shown) provided between channels 24, 26, and a drive motor located at 30 (see FIGURE 4) at the receiving end R of conveyor 20 is operative to drive belt 28 at a predetermined speed substantially in excess of about 400 feet per minute and preferably at least about 600 feet per minute. A delivery hood (not shown) may be provided at the discharge end D of distributing conveyor 20 in order to permit greater control to be exercised over the concrete mix flowing from discharge end D at the construction site.

Support frame assembly 18 comprises a trussed structure 32 having a bail 34 positioned at its outer end. Support frame 18 is pivotally mounted in yoke 16, which comprises a lower cross member 36, a pair of side members 38, a pair of upper cross members 40, and a sleeve 42, by means of a pair of pivot shafts 44 (only one of which is visible in the drawings) which pass through the sides of support frame 18 and side members 38 of yoke 16. A telescoping brace 46, the length of which is controlled by motor driven power jack assembly 48, is provided between sleeve 42 and trussed structure 32 of assembly 18 and thereby determines the relative elevation of support frame assembly 18 as it pivots about pivot pins 44. Sleeve 42 is pivotally mounted on trailer assembly 14 in a manner hereinafter described in detail.

Distributing conveyor 20 is mounted on support frame assembly 18 for longitudinal movements by means of rollers, such as roller 49, which are provided on structure 32 and upon which the channels 24, 26 of conveyor 20 are movably mounted. Longitudinal movements of distributing conveyor 20 in relation to support frame assembly 18 may be achieved in a semi-automatic manner by means of a motor (not shown) which may be provided on structure 32 and which is adapted to drive friction rollers that are operative to move conveyor 20 longitudinally with respect to structure 32. Of course, other power means (e.g., a chain and sprocket assembly or a rack and pinion arrangement) may be employed to extend or retract conveyor 20, and conveyor 20 may be manually moved as well. Operation of telescoping brace 46 will elevate or lower the support frame assembly so that the distributing conveyor may be moved in a variety of predetermined longitudinal paths. Once a particular path has been chosen, the rollers (such as roller 49) and channels 24, 26 allow controlled movement along the path, but prevent movement of the distributing conveyor with respect to the support frame assembly along a path perpendicular to the predetermined longitudinal path. As a result, the distributing conveyor may be operated in its fully extended position without support for the discharge end (D) thereof.

A unitary chute structure 50 is welded between upper cross members 40. A ring 52 is rotatably mounted adjacent the top of chute structure 50. A pair of mounting posts 54 (only one of which is visible in FIGURE 5) are provided on ring 52 for a purpose that will hereinafter appear.

The foregoing description of distributing conveyor 20 and its associated support frame assembly 18 and yoke 16 is more fully set forth in the aforesaid Ser. No. 575,503 application.

Feeding conveyor 22 has a discharge end D' and a receiving end R' and comprises a pair of side channel members 60, 62 between which a plurality of idler rollers 64 (see FIGURE 2) are pivotally mounted. An endless conveyor belt 66 is mounted on rollers 64, and a drive motor (not shown), provided at end R' of conveyor 22, is designed to drive belt 66. A receiving hopper 68 is provided at the receiving end R' of conveyor 22 and is designed to receive concrete mix from a source, such as a ready-mix truck or a conveyor of the character described in the aforesaid U.S. Patent No. 3,151,732.

A pair of brackets 70 (only one of which is shown in FIGURE 5) are provided at the discharge end of each feeding conveyor side channel member 60, 62, and each bracket has an opening formed therein and adapted to fit downwardly over previously described mounting posts 54 on ring 52. In this manner, the discharge end D' of feeding conveyor 22 is supported by yoke 16, and yet the yoke 16 may be pivoted with respect to end D' of conveyor 22 about a vertical axis passing through the center of sleeve 42 and ring 52.

As described in greater detail in Oury U.S. Patent No. 3,171,534, baffle means in the form of a hood 72 is provided at the discharge end D' of feeding conveyor 22. Hood 72 is preferably formed of a durable flexible material, such as the material from which conveyor belts are made, and the bottom ends thereof are tucked into chute structure 50, the lower end of which terminates adjacent belt 28. An open bottom splash hood 74 is removably mounted over the lower end of chute structure 50. Concrete mix conveyed along belt 66 of conveyor 22 is hurled against hood 72, which directs it downwardly through chute structure 50, which in turn directs the mix onto the belt 28 of conveyor 20. Splash hood 74 serves to prevent concrete mix from being thrown off of the belt 28 as it is passed through the chute structure 76. In this manner, the concrete mix does not separate into discrete cement, gravel, and sand particles.

As best shown in FIGURES 3 and 4, trailer assembly 14 embodies a rear frame 100 and a forwardly extending center beam 102. The frame 100 comprises a pair of side channels 104, 106, a front channel 108, and a pair of rear channels 110, 112, all of which may take the form of suitable metal channels or angles and which are welded in the configuration shown in detail in FIGURES 3 and 4. As best shown in FIGURE 4, side channels 104, 106 are not straight, but instead a front portion 104', 106' of each is configured upwardly so as to permit front channel 108 to rest upon center beam 102. Similarly, rear channels 110, 112 are angled as best shown in FIGURE 3. Cross angles 114, 116 are welded between side channels 104, 106, and a cross channel 118 is welded between angles 114, 116. A cross angle 120 is provided between side member 104 and cross angle 118 in order to provide support for power means hereinafter described.

An axle 122 is journaled for rotation in a pair of bearing sleeves 124 provided in side channels 104, 106, and a pair of rubber-tired wheels 126 are mounted at each end of axle 122.

A cross angle 130 is provided between portions 104' and 106' of the rear frame side channels, and one end of center beam 102 is secured, as by welding, to angle 130. Center beam 102 is similarly attached to the front channel member 108, so as to firmly interconnect rear frame 100 and center beam 102. A hitching bracket 132 (see FIGURES 3 and 4) is provided at the forward end of center beam 102 for use in attaching trailer assembly 14 to a suitable vehicle, such as truck 12.

A cross bar 140 is attached to center beam 102 near its front end, and a pair of upstanding brackets 142, 144 are welded to cross bar 140 adjacent each of its ends. A pair of braces 146, 146 are welded between cross bar 140 and bracket 142 and a similar pair of braces 148, 148 are welded between cross bar 140 and bracket 144. A plurality of corresponding horizontally aligned holes 150, 152 are provided in upstanding brackets 142, 144 for a purpose that will hereinafter appear.

A removable front wheel assembly 160 (see FIGURE 4) comprises a shaft 162 journaled for rotation in an opening provided in the forward end of center beam 102, a yoke 164 provided at the lower end of shaft 162, and an axle 166, upon which a rubber-tired wheel 168 is mounted. A forwardly projecting handle 170 is provided at the upper end of shaft 162 so that when handle 162 is moved from side to side, the precise direction of wheel assembly 160 is varied. In this manner, movement of the trailer assembly 14 and its associated parts can be controlled, that is, assembly 160 is adapted to accomplish a steering function. Assembly 160 is removable—i.e., by detaching handle 170 from shaft 162, the center beam 102 may be lifted away therefrom—in order to facilitate hitching trailer assembly 14 to a vehicle such as truck 12.

As best shown in FIGURES 4 and 5, a generally upstanding post 180 terminating in a smaller diameter pivot shaft 182 is welded to the frame 100 at the point of intersection of channels 110, 112. Sleeve 42 of yoke 16 is received downwardly in a pivotal fashion over pivot shaft 182. In this manner yoke 16, support frame assembly 18, and the distributing conveyor 20 are pivotally supported by trailer assembly 14. Also, as previously described, the discharge end D' of feeding conveyor 22 is mounted above yoke 16 and hence it is likewise supported by post 180 and frame 100.

A removably mounted cross rod 190 (see FIGURE 1) is adapted for insertion through corresponding pairs of holes 150, 152 provided in brackets 142, 144. Rod 190 supports the conveyors 20, 22 during transportation. As best shown in FIGURE 1, when being transported from place to place, the discharge end D of conveyor 20 is positioned downwardly between braces 28, 30 and rests on rod 190. The receiving end R' of conveyor 22 in turn is positioned downwardly between brackets 142, 144 and rests on the discharge end D of conveyor 20. When in use at a job site, the discharge end D of conveyor 20 is removed and the receiving end R' of feeding conveyor 22 rests on rod 190. The plurality of holes 150, 152 are provided in order that the precise vertical position of rod 190 and hence of the conveyors may be varied, as desired.

As best shown in FIGURE 5, self-contained power means 200 are mounted on the cross angles and channels 114, 116, 118, 120, and a generally U-shaped protective hood 202 is mounted over the self-contained power means 200 to protect it from inclement weather and from any concrete mix that should be spilled from conveyors 20, 22. The self-contained power means comprises a fuel supply (e.g., tank 204), an internal combustion engine and a generator operatively connected thereto (indicated generally at 206. Generator 206 is adapted to supply electric power for the motors driving conveyor belts 28, 66 and in addition, for the jack assembly 48, adapted to control the elevation of the support frame assembly 18. Likewise, power is supplied to the electric motor (not shown) adapted to effect the retraction and extension of conveyor 20 on support frame assembly 18. Of course, other means of supplying power (e.g., hydraulic means could be employed to power the various portions of the device disclosed herein.

Means for controlling the supply of current to these motors is provided at one point (adjacent either the discharge end D or the receiving end R of conveyor 22). In addition, a motor, indicated generally at 208, geared to axle 122 in a conventional manner is advantageously provided so as to render trailer assembly 14 self-propelled, thereby facilitating the movement of trailer assembly 14 to nearby pouring stations. preferably, motor 208 is electric and is driven by current from generator 206; however, the previously described internal combustion engine could, of course, also be employed to drive axle 122 and hence wheels 126.

In operation trailer assembly 14 with conveyors 20 and 22 disposed as shown in FIGURE 1, may be maneuvered to the general work location by truck 12, after which hitching bracket 132 is disconnected from truck 12, and the truck 5 is driven away. Forward wheel assembly 160 is then attached to center beam 102, and the precise position of trailer assembly 14 may then be adjusted by starting the internal combustion engine and generator 206, and using the current therefrom to energize motor 208, thereby to drive wheels 126. Steering may be accomplished by turning handle 170 in the desired direction.

When the trailer assembly 14 is in position, the operator then lifts the receiving end R' of conveyor 22 from the top of conveyor 20, and conveyor 20 is then raised and retracted via the described leveling and retracting electric motors and is swung out of the way. Feeding conveyor 22 is then placed downwardly between brackets 142, 144 so as to rest on rod 190. Conveyor 20 may then be positioned over the work area by means of the leveling and retracting motors (which control the elevational and longitudinal movements respectively) and by manually swinging conveyor 20 about the pivot post 180. The approximate position of conveyor 20 when oriented over one given work area to the right of trailer assembly 14 is illustrated in broken lines in FIGURE 2. The source of concrete mix (i.e., ready-mix truck, conveyor, or the like) is then disposed over receiving hopper 68. Generally, the top edge of hopper 68 should be located just below the source of concrete mix, and the height of receiving end R' of conveyor 22 may be adjusted as required by varying the position of rod 190.

Belts 28 and 66 on conveyors 20 and 22, respectively, are then started by applying current to their respective electric motors, and concrete mix is poured into hopper 68. The concrete mix flows onto belt 66 on conveyor 22 and is moved thereon to the discharge end D' thereof where it is thrown against hood 72, which directs it downwardly via chute structure 50 onto belt 28 at the receiving end R of conveyor 20. As more fully set forth in the aforesaid Patent No. 3,171,534, the hood and chute cooperate to maintain the concrete mix in proper form (i.e., it does not separate into its component parts). Belt 28 then moves the concrete mix toward the discharge end D of conveyor 20.

As the cement laying operation progresses, the operator controls the longitudinal position of conveyor 20 by operation of the previously described retractor motor and the elevation thereof by operation of motor 48. Moreover, the same operator may swing conveyor 20 from side to side over a large work area by pivoting the conveyor around the post 180.

After the pouring has been completed, the various parts are preferably washed with water, and conveyor 22 is then removed from between brackets 142, 144 and the rod 190 is replaced at the point shown in FIGURE 1. Conveyor 20 is restored to its traveling position, and feeding conveyor 31 is then placed in its traveling position (see FIGURE 1). The front wheel assembly 160 may be removed and the trailer assembly 14 reattached to truck 12 by means of hitching bracket 132. The device may then be transported to another location. The entire set up, operation, take down, and transportation of the device may be performed by a single operator in a short period of time. Alternatively, if the next work area is near, the electric motor driving wheels 126 may be energized and trailer assembly 14 may be moved to the new area under its own power.

It is especially important to note that because of the relative size of trailer assembly 14 and, particularly, because of the length and weight of the loaded feeding conveyor 22, no stabilizing arrangement (such as the outriggers as shown in the aforesaid Ser. No. 575,503 application) is required, even when the distributing conveyor 20 is positioned in its extended position. Rather, the mounting of feeding conveyor 20 on trailer assembly 14, together with the size of trailer assembly 14, including power means 200, provides sufficient stability to the conveyor construction to obviate the necessity for outrigger stabilizing means. Thus, the provision of a unitary trailer construction adapted to support the described feeding conveyor and the swinging distributing conveyor adapted for longitudinal and pivotal movements in three directions, together with the provision of self-contained power means, amounts to an especially useful piece of construction equipment.

The device of the present invention may quickly and easily be arranged for use, and yet when assembled it may be employed for the pouring of concrete mix in difficult locations such as bridge decks, caissons, free standing columns and column caps, sloping walls, and factory floors. In particular, the sloping wall under a bridge deck may be poured in a single operation as the distributing conveyor is held in cantilever fashion over the work area so that the steel reinforcing mat need not be disturbed by stands, trackways or the like. The design of the subject invention is such that little time is lost in preparing the equipment for the pouring of concrete mix and thus greater usage of the equipment is obtained relative to the prior art equipment which required more labor and time to arrange for use. Moreover, while the present invention has been specifically described with reference to the conveyance and distribution of concrete mix, as will be obvious to those skilled in the art, the novel conveyor construction of the present invention may also be employed to transport or convey other materials such as clay, gravel, sand, coal and the like.

It should be understood that various changes, modifications, and alterations may be effected in the parts and elements of the described embodiments without departing from the spirit and the scope of the present invention as described in the appended claims.

What is claimed is:

1. In a device for transporting and distributing concrete mix and the like, the combination comprising:
    a transport and support trailer assembly adapted for normal vehicular travel and further adapted for positioning near the location at which concrete mix is to be deposited;
    frame mounting means mounted on the trailer assembly adjacent one end thereof for rotational movement about a vertical axis;
    a support frame assembly mounted adjacent one of its ends on the frame mounting means in a cantilever fashion for pivotal movement about a horizontal axis;
    distributing conveyor means mounted for longitudinal movement upon the cantilevered support frame assembly, said distributing conveyor means having an unsupported discharge end positioned away from the support frame assembly;
    conveyor support means on the trailer assembly adjacent the other end thereof;
    feeding conveyor means pivotally mounted at one end on the frame mounting means and adapted to be supported at its other end by the conveyor support means; and
    means for directing concrete mix from the said one end of the feeding conveyor to an adjacent point on the distributing conveyor,
    whereby the trailer assembly and feeding conveyor means stabilize the said device when the distributing conveyor means is longitudinally moved to an extended position on the support frame assembly.

2. A combination, as claimed in claim 1, wherein the frame mounting means comprises a yoke pivotally mounted on the trailer assembly.

3. A combination, as claimed in claim 2, wherein the trailer assembly comprises:
    a rear frame structure;
    a forwardly extending center beam fixedly attached to the rear frame structure;
    a transverse axle journaled in the rear frame structure for rotation about a horizontal axis;
    rear wheel members mounted on the axle at each end thereof for rotation with the axle; and
    a front wheel assembly attached to the center beam adjacent its forward end for pivotal movement about a vertical axis and including a front wheel member mounted in said front wheel assembly for rotation about a horizontal axis.

4. A combination, as claimed in claim 3, wherein the rear frame structure includes channel means at the rearward end thereof having an upstanding pivot post affixed thereto; and wherein the yoke includes a downwardly extending sleeve adapted to be received over the said pivot post whereby the yoke is pivotally mounted on the said pivot post.

5. A combination, as claimed in claim 3, wherein the conveyor support means comprises:
    a cross bar member fixedly attached to the center beam adjacent its forward end;
    an upstanding bracket mounted at each end of the cross bar; and
    means in association with the upstanding brackets for supporting at least one conveyor means therebetween.

6. A combination, as claimed in claim 5, wherein the front wheel assembly is removably attached to the center beam and wherein the means in association with the upstanding brackets comprises:
    a plurality of holes formed in each bracket along a generally vertical line, each given hole in one bracket being horizontally aligned with a corresponding hole in the other bracket; and
    a rod adapted to be removably positioned in any one of the corresponding pairs of holes.

7. A combination, as claimed in claim 3, wherein the rear frame structure includes a channel means at the rearward end thereof having an upstanding pivot post affixed thereto; wherein the yoke includes a downwardly extending sleeve adapted to be received over the said post whereby the yoke is pivotally mounted on the said pivot post; and wherein the conveyor support means comprises a cross bar member fixedly attached to the center beam adjacent its forward end, an upstanding bracket mounted at each end of the cross bar, a plurality of holes being formed in each bracket along a generally vertical line, each given hole in one bracket being horizontally aligned with a corresponding hole in the other bracket, and a rod adapted to be removably positioned in any one of the corresponding pairs of holes in order to support at least one conveyor means between the brackets.

8. A combination, as claimed in claim 3, and further comprising power means mounted at least in part on the rear frame structure of the trailer assembly and adapted to supply power to effect longitudinal movements of the distributing conveyor on the support frame assembly, to effect pivotal movements of the support frame assembly with respect to the yoke means, and to effect power driven rotation of the transverse axle and rear wheel members, the said power means including an internal combustion engine, an electric generator, and, in association therewith, a plurality of electric motors.

9. A combination, as claimed in claim 2, wherein the yoke includes a pair of top members each fixed to an inclined chute structure, the lower edge of which terminates adjacent the distributing conveyor means, and wherein the means for directing concrete mix comprises baffle means provided at the said one end of the feeding conveyor means and adapted to direct concrete mix from the said one end of the feeding conveyor means into the inclined chute structure which is adapted to convey the concrete mix onto the distributing conveyor means.

10. In an apparatus for transporting and distributing concrete mix and the like comprising a cantilevered distributing conveyor mounted for longitudinal and pivotal movements in three planes, said distributing conveyor having an unsupported discharge end, a feeding conveyor, and means for directing concrete mix from the feeding conveyor onto the distributing conveyor, the improvement comprising a transport and support trailer assembly, the said trailer assembly comprising:

a rear frame structure including cross channel means at the rearward end thereof having an upstanding pivot post affixed thereto for pivotally mounting a distributing conveyor supporting structure;

a forwardly extending center beam fixedly attached to the rear frame structure;

a transverse axle journaled in the rear frame structure for rotation about a horizontal axis;

rear wheel members mounted on the axle at each end thereof for rotation with the axle about a horizontal axis;

a front wheel assembly attached to the center beam adjacent its forward end for pivotal movement about a vertical axis and including a front wheel member mounted in said front wheel assembly for rotation about a horizontal axis;

a cross bar member fixedly attached to the center beam adjacent its forward end;

an upstanding bracket mounted at each end of the cross bar; and means in association with the upstanding brackets for supporting at least one conveyor therebetween.

11. A combination, as claimed in claim 10, wherein the front wheel assembly is removably attached to the center beam and wherein the means in association with the upstanding bracket comprises:

a plurality of holes formed in each bracket along a generally vertical line;

each given hole in one bracket being horizontally aligned with a corresponding hole in the other bracket; and a rod adapted to be removably positioned in any one of the corresponding pairs of holes.

12. A combination, as claimed in claim 11, and further comprising power means mounted at least in part on the rear frame structure of the trailer assembly and adapted to supply power for driving at least the transverse axle and rear wheel members, the said power means including an internal combustion engine, and electric generator, and, in association therewith, at least one electric motor.

References Cited
UNITED STATES PATENTS

| | | | |
|---|---|---|---|
| 923,815 | 6/1909 | Cralle | 182—66 |
| 2,796,999 | 6/1957 | Russell | 198—92 |
| 3,144,150 | 8/1964 | Cox | 280—414 |
| 3,151,732 | 10/1964 | Oury | 198—92 |
| 3,233,766 | 2/1966 | Clausen | 280—475 |

RICHARD E. AEGERTER, *Primary Examiner.*